United States Patent [19]

Takada et al.

[11] Patent Number: 5,471,424
[45] Date of Patent: Nov. 28, 1995

[54] WRITE ONCE TYPE INFORMATION RECORDING MEDIUM, METHOD AND APPARATUS FOR FORMATTING THE SAME, AND METHOD AND APPARATUS FOR WRITING DATA TO OR READING DATA FROM THE SAME

[75] Inventors: Masayuki Takada; Osamu Yamada; Toru Kuroda, all of Tokyo; Koichi Yamazaki, Sakado; Kazuo Noda, Yokohama, all of Japan

[73] Assignees: Nippon Hoso Kyokai; Nippon Conlux Co., Ltd., both of Tokyo, Japan

[21] Appl. No.: 219,303

[22] Filed: Mar. 28, 1994

[30] Foreign Application Priority Data

Mar. 29, 1993 [JP] Japan .................... 5-069830
Mar. 15, 1994 [JP] Japan .................... 6-044032

[51] Int. Cl.⁶ .................... G11C 7/00; G06K 7/10
[52] U.S. Cl. .................... 365/189.01; 365/94; 365/215; 360/48; 360/49; 369/275.3
[58] Field of Search .................... 365/189.01, 94, 365/215; 360/48, 49; 369/275.1, 275.3, 275.4, 277, 47; 371/39.1, 38.1

[56] References Cited

U.S. PATENT DOCUMENTS

| | | | |
|---|---|---|---|
| 4,497,050 | 1/1985 | Beetstra | 369/59 |
| 4,982,077 | 1/1991 | Kawamura | 369/275.3 X |
| 5,051,569 | 9/1991 | Tsuruoka et al. | 369/275.3 X |
| 5,148,422 | 9/1992 | Sako et al. | 369/275.1 |
| 5,270,998 | 12/1993 | Uchiumi | 369/277 |
| 5,325,352 | 6/1994 | Matsumoto | 369/275.1 |

FOREIGN PATENT DOCUMENTS

| | | |
|---|---|---|
| 0342833 | 11/1989 | European Pat. Off. . |
| 0520381 | 12/1992 | European Pat. Off. . |
| 2187008 | 8/1987 | United Kingdom . |

*Primary Examiner*—David C. Nelms
*Assistant Examiner*—Huan Hoang
*Attorney, Agent, or Firm*—Spencer, Frank & Schneider

[57] ABSTRACT

A write once type information recording medium having a recording format that includes sectors. Each Sector includes x pieces of p-bit frames. Each frame contains an f-bit synchronization signal region and a d-bit data region. Each bit of at least one x-bit packet in which a v-bit error correction code has been added to u-bit data, is distributed to each one of the data regions of the x pieces of frames. This makes it possible for the write once type information recording medium to have an increased data storage efficiency and an effective error correction capability for a burst error.

18 Claims, 10 Drawing Sheets

FIG. 1 (PRIOR ART)

F, $a_1$, $b_1$, $c_1$, ---$n_1$, F, $a_2$, $b_2$, $c_2$, ----, $n_2$ ------, F, $a_{272}$, $b_{272}$, $c_{272}$, ----,$n_{272}$ SECTOR

FIG. 2 (PRIOR ART)

F, $a_1$, $b_1$, $c_1$, F, $a_2$, $b_2$, $c_2$ ------ F, $a_{272}$, $b_{272}$, $c_{272}$ | UNRECORDED PORTION | SECTOR

WRITE ONCE TYPE INFORMATION RECORDING MEDIUM, METHOD AND APPARATUS FOR FORMATTING THE SAME, AND METHOD AND APPARATUS FOR WRITING DATA TO OR READING DATA FROM THE SAME

BACKGROUND OF THE INVENTION

1. Field of the Invention

The present invention generally relates to a write once type information recording medium such as an optical memory card. More specifically, the present invention is directed to a method and apparatus which is capable of formatting a write once type information recording medium with increasing storage efficiency, and which has the capability of correcting burst errors, to a write once type information recording medium formatted in accordance with the above-mentioned format, and to a method and apparatus for writing data to or reading data from such a write once type information recording medium.

2. Description of Related Art

The need has risen to increase data recording density in view of an economical point when data are recorded on an information recording medium. However, when the data recording density is increased, errors occurring in the reproduced data can increase because of, for instance, defects in the recording medium.

In general, to reduce errors in the reproduced data, an error correction code is added to the data during a data recording operation so as to perform the error correction. There are typically two different types of errors ocurring in the reproduced data, namely, random errors occurring at random, and burst errors occurring in a continuous manner. Once a burst error occurs, it can be hard to correct owing to a large number of continuous errors included therein.

To make error correction feasible, interleaving is carried out in a conventional information recording system. That is, a series of data is subdivided into a large number of data segments which will then be distributed in the recording medium. In this case, even if positionally continuous errors occur on the recording medium due to defects thereof, the errors are not continuous in on the reproduced data. As a result, these errors can be corrected as random errors.

Figure 1:
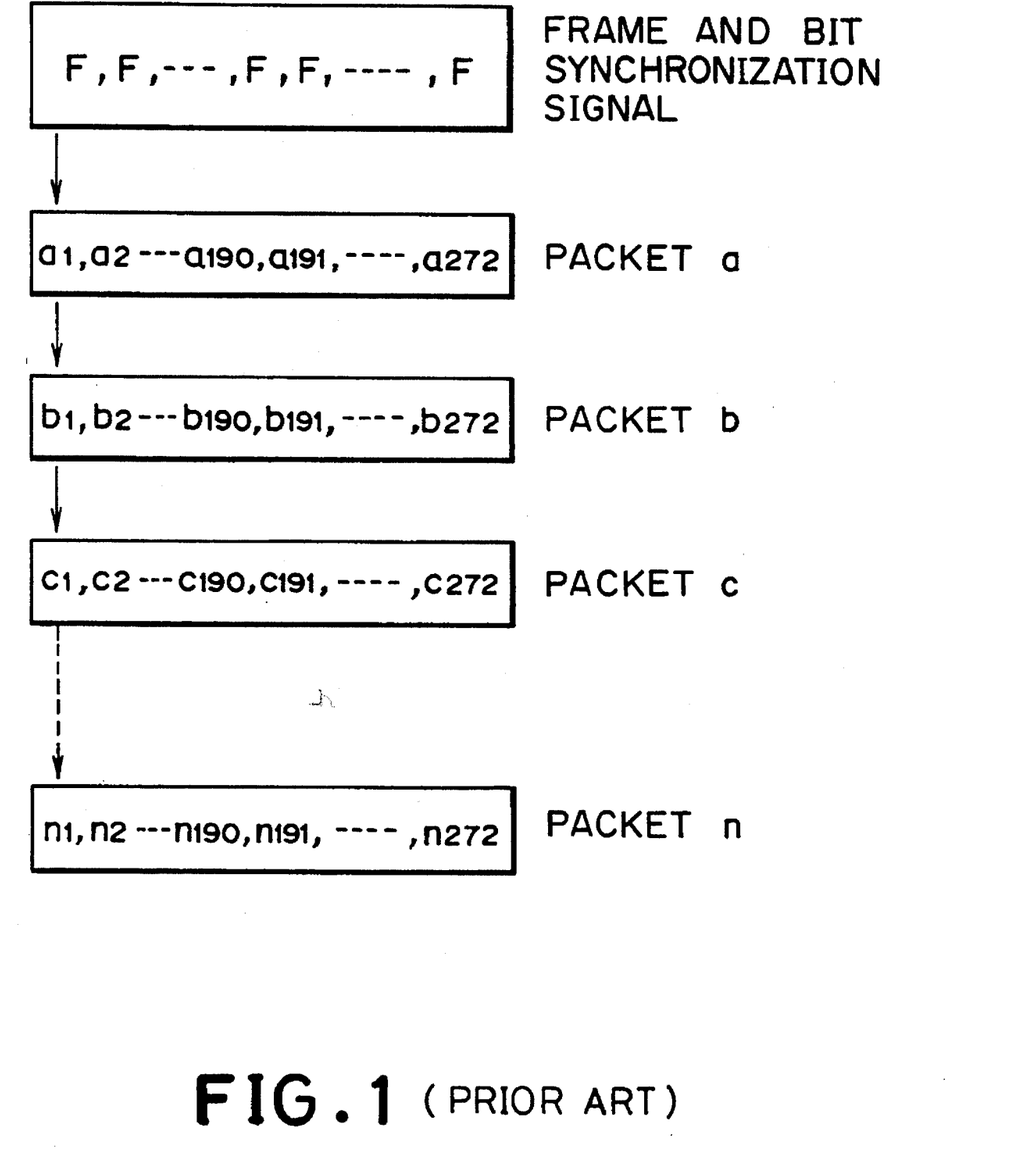
FIG. 1 is a diagram for explaining a conventional interleaving process.

FIG. 1 schematically represents an example of the conventional interleaving technique. In accordance with the conventional interleaving method, 272 "synchronization signals for a frame and bit" (simply, referred to "synchronization signals") are first arranged, each of which is composed of 8 bits, for instance, and indicated by symbol "F" as illustrated in FIG. 1. Subsequently, a 272-bit packet "a", a 272-bit packet "b", a 272-bit packet "c", - - - , a 272-bit packet "n" are arranged in parallel to each other, as illustrated in FIG. 1. The first 272-bit packet "a" contains 190-bit data consisting of a1, a2, - - - , and a190, and an 82-bit error correction code consisting of a191, a192, - - - , and a272. Similarly, the second 272-bit packet "b" contains 190-bit data consisting of b1 to b190, and an 82-bit error correction code consisting of b191 to b272, and the third 272-bit packet "c" contains 190-bit data consisting of c1 to c190, and an 82-bit error correction code consisting of c191 to c272. Also, the final 272-bit packet "n" contains 190-bit data consisting of n1 to n190, and an 82-bit error correction code consisting of n191 to n272.

Figure 2:
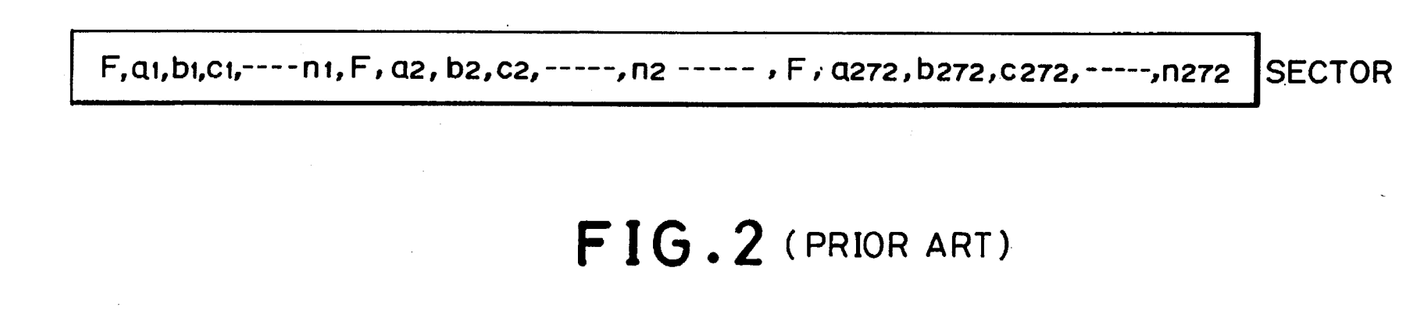
FIG. 2 schematically indicates an example of the conventional sector structure.
Figure 3:
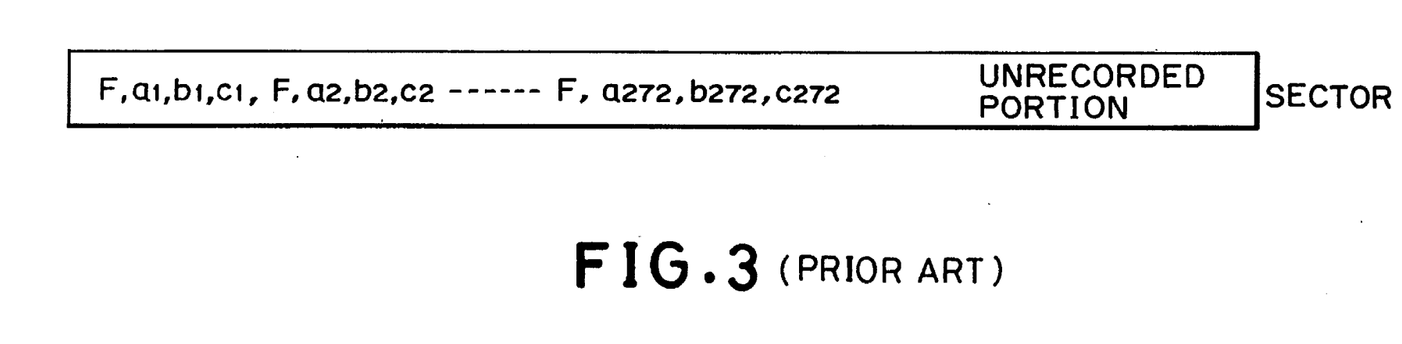
FIG. 3 schematically illustrates another example of the conventional sector structure.

The 8-bit synchronization signals and the plurality of packets, which have been arranged in the above-described manner, are read in the direction indicated by arrows shown in FIG. 3 as follows. The reading operation is carried out sequentially from the synchronization signal F, the first bit a1 of the first packet "a", the first bit b1 of the second packet "b" the first bit c1 of the third packet "c" and up to the first bit n1 of the last packet "n". Next, the reading operation is performed sequentially from the synchronization signal F, the second bit a2 of the first packet "a", the second bit b2 of the second packet "b" the second bit c2 of the third packet "c", and up to the second bit n2 of the final packet "n". In this reading manner, the packets up to the 272-nd bit n272 of the last packet "n" are read out, and then they are rearranged as a bit stream as shown in FIG. 2. Conventionally, such a rearranged bit stream is recorded on the information recording medium.

The bit stream, beginning from the synchronization signal "F" through a1 to n272, as shown in FIG. 2 is called a "sector". In the conventional recording medium with the above described recording format, the larger the number of interleaving processes becomes (namely, the greater the quantity of packets becomes), the more error correction can be performed with respect to the burst error. However, the increasing number of interleaving processes requires a longer sector. Since various lengths of data are normally recorded in a single sector, a long sector may include a useless (unused) storage capacity in case of short (small) data. Consider now the case where short data having three packets is stored into a long (large) sector. As shown in FIG. 3, even if (272×(8+3) bits data from F, a1, b1, c1, F, a2, b2, c2, - - - , up to F, a272, b272 and c272 is recorded in this large sector, a substantial sector portion will remain as a "nonrecorded portion". Furthermore, if the fourth packet d1, d2, - - - , d272 is to be additionally recorded into this large sector, although the bit "d1" should be originally interleaved between the above bit c1 and the synchronization signal F, this bit "d1" cannot be inserted between c1 and F since the bit c1 and the synchronization signal F are consecutive. Similarly, the second bit "d2" of the fourth packet cannot be inserted between the bit c2 and the synchronization signal F.

Although the overall portion of one sector may be rewritten in a rewritable type information recording medium, additional recording becomes practically difficult in the case of a write once type information recording medium. Furthermore, additional writing of information into a non-recorded portion will reduce the error correction capability as compared with the case wherein all frames of this recording medium are originally interleaved to be stored. This is because a single sector will be divided into more than two groups in such a case, and hence, the total number of interleaving processes is decreased.

As previously described, the conventional data recording medium posses a trade-off problem in that if a sector is set long, the useless unrecorded portion is increased, and therefore the recording efficiency is lowered, whereas if a sector is set short, the error correction capability is reduced.

SUMMARY OF THE INVENTION

It is therefore an object of the present invention to provide a write once type information recording medium having a recording format suitable for correcting errors and also capable of increasing storage efficiency.

Another object of the present invention is to provide a method and an apparatus capable of formatting a write once type recording medium, while optimizing storage efficiency and improving error correction capability.

A further object of the present invention is to provide a data writing/reading apparatus capable of writing data to and reading data from a write once type recording medium, while optimizing storage efficiency and improving error correction capability.

In the first aspect of the present invention, there is provided a write once type information recording medium having a format that includes sectors, each of the sectors including x pieces of p-bit frames, each of the frames comprising:

an f-bit synchronization signal region; and a d-bit data region;

where x, p, f, and d are positive integers.

In the second aspect of the present invention, there is provided a method for formatting a write once type recording medium, by forming plurality of sectors on the write once type recording medium, each of the sectors including x pieces of p-bit frames, each of the frames containing an f-bit synchronization signal region and a d-bit data region, comprising the steps of:

writing x pieces of the synchronization signal into a position separated by a d-bit data region following the preceding synchronization signal beginning from the first synchronization signal at the starting position of the sector;

where x, p, f and d are positive integers.

In the third aspect of the present invention, there is provided a method for writing data into a write once type recording medium having a format that includes sectors, each of the sectors including x pieces of p-bit frames, each of the frames containing an f-bit synchronization signal region and a d-bit data region, the method comprising:

a memory storage step for storing into a memory, at least one x-bit packet in which a v-bit error correction code has been added to u-bit data; and a data writing step for writing the respective bits of the packet read out from the memory into the data regions of the x pieces of frames;

where x, p, f, d, u, and v are positive integers.

In the fourth aspect of the present invention, there is provided a method for reading data from a write once type recording medium having a format that includes sectors, each of the sectors including x pieces of p-bit frames, each of the frames containing an f-bit synchronization signal region and a d-bit data region, the data recording method comprising:

a step for storing into a memory, x pieces of data read out from the data regions of the x pieces of frames;

a step for reading information in unit of a single bit from the x pieces of data stored in the memory; and a step for serially connecting the read information to construct an x-bit packet;

where x, p, f, and d are positive integers.

In the fifth aspect of the present invention, there is provided a formatting apparatus for formatting a write once type recording medium, by forming a plurality of sectors on the write once type recording medium, each of the sectors including x pieces of p-bit frames, each of the frames containing an f-bit synchronization signal region and a d-bit data region, comprising;

a ROM (read only memory) for previously storing a program to execute an initiating process of the formatting apparatus when a power supply of the formatting apparatus is turned ON;

input means for inputting an instruction of a format;

synchronization signal writing means for writing x pieces of the synchronization signal into a position separated by a d-bit data region following the preceding synchronization signal beginning from the first synchronization signal at the starting position of the sector based upon the input of the format instruction; and output means for outputting a completion of the format after the formatting operation has been accomplished;

where x, p, f, and d are positive integers.

In the sixth aspect of the present invention, there is provided a data writing apparatus for writing data into a write once type recording medium having a format that includes sectors, each of the sectors including x pieces of p-bit frames, each of the frames containing an f-bit synchronization signal region and a d-bit data region, the data writing method comprising:

a ROM (read-only memory) for previously storing a program to execute an initiating process of the data writing apparatus when a power supply of the data writing apparatus is turned ON;

a memory for storing at least one x-bit packet in which a v-bit error correction code has been added to u-bit data;

data writing means for writing the respective bits of the packet read out from the memory into the data regions of the x pieces of frames; and output means for outputting a completion of the data writing operation after the data has been written;

where x, p, f, d, u, and v are positive integers.

In the seventh aspect of the present invention, there is provided a data reading apparatus for reading data from a write once type recording medium having a format that includes sectors, each of the sectors including x pieces of p-bit frames, each of the frames containing an f-bit synchronization signal region and a d-bit data region, the data reading, apparatus comprising:

a ROM (read-only memory) for previously storing a program to execute an initiating process of the data reading apparatus when a power supply of the data reading apparatus is turned ON;

a memory for storing x pieces of data read out from the data regions of the x pieces of frames; and reading means for reading information from the x pieces of data stored in the memory in unit of a single bit;

where x, p, f, and d are positive integers.

Only the synchronization signals are recorded with a predetermined interval, and the data are sequentially recorded bit by bit following the respective synchronization signals, thereby scattering data strings. As a consequence, even if an amount of data is small, higher error correction capability can be achieved with respect to burst errors.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Referring now to the drawings, various preferred embodiments of the present invention will be described in detail.

Embodiment 1

Figure 4:
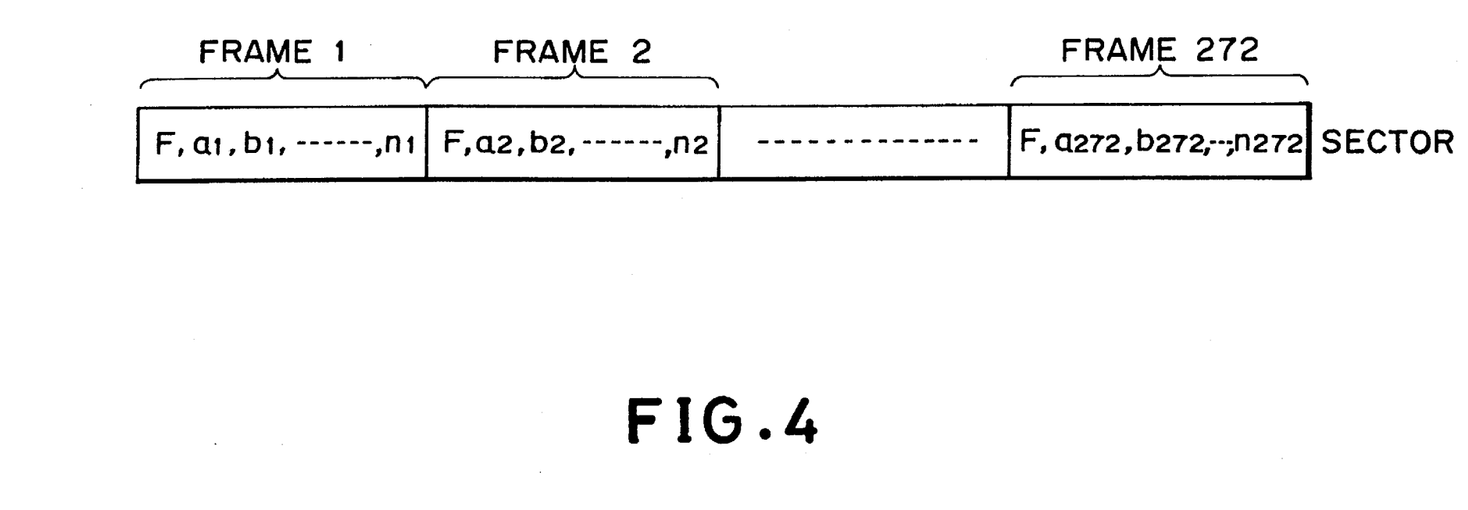
FIG. 4 schematically shows an example of the arrangement of frames and a sector in the recording format of a write once type information recording medium according to the present invention.

In FIG. 4, there is shown one concrete example of a recording format employed in the present invention. As shown in this drawing, a single sector is formed by serially arranging 272 pieces of 48-bit frames (usually, x pieces of frames with 48 bits). A 48-bit (usually, p bits) frame contains an 8-bit (usually, f bits) synchronization signal "F" placed at the leading portion, and maximum 40 bits (usually, p-f bits) of data and an error correction code following the synchronization signal "F". In other words, one sector is constructed of 48×272 bits (usually, px bits).

Both the data and the error correction codes are recorded in such a memory region whose capacity is an integer multiple of the bit size of a single packet, where the integer is 1–40. A single packet includes 190-bit (usually, u-bit) data and an 82-bit (usually, v-bit) error correction code.

Figure 5:
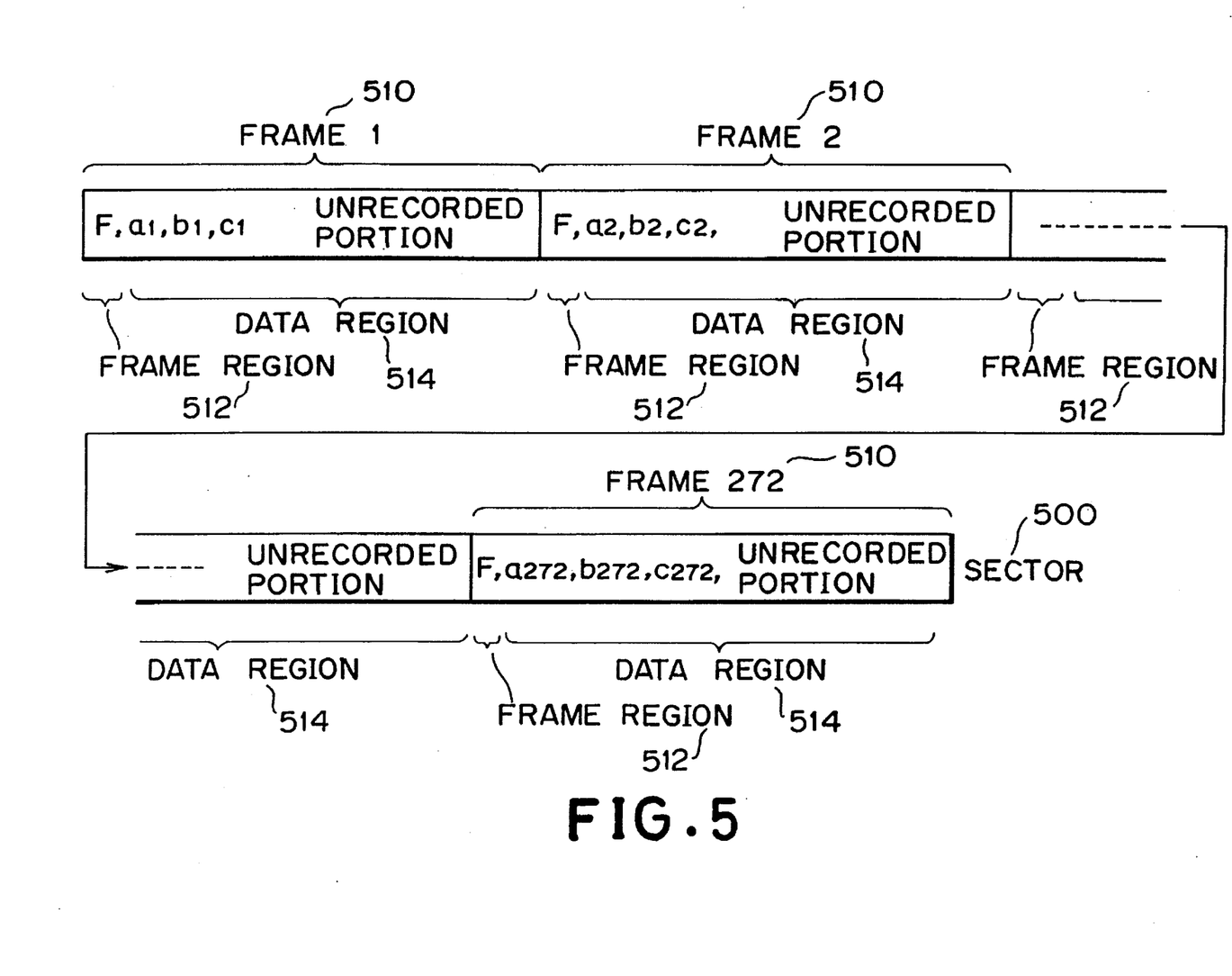
FIG. 5 schematically represents another example of the arrangement of frames and a sector in the recording format of the write once type information recording medium shown in FIG. 4.

When the data is short, consisting of three packets as illustrated in FIG. 5, for example, the synchronization signal "F", and the three bits "a1", "b1", "c1" are recorded in frame 1. Similarly, the synchronization signal "F", and the three bits "a2", "b2", "c2" are recorded in frame 2, and finally the synchronization signal "F", and the three bits "a272", "b272", "c272" are recorded in frame 272. As will be apparent from FIG. 5, an additionally writable non-recorded portion is left in each of these 272 frames. When a packet 4 is additionally written, the bit "d1" of the fourth package is additionally written following to the bit c1 within the frame 1, which already has the synchronization signal "F" Similarly, the other bits "d2", "d3", - - - , "d272" of the fourth packed are successively written after the preceding bits "c2", "c3", - - - , "c272".

Figure 6:
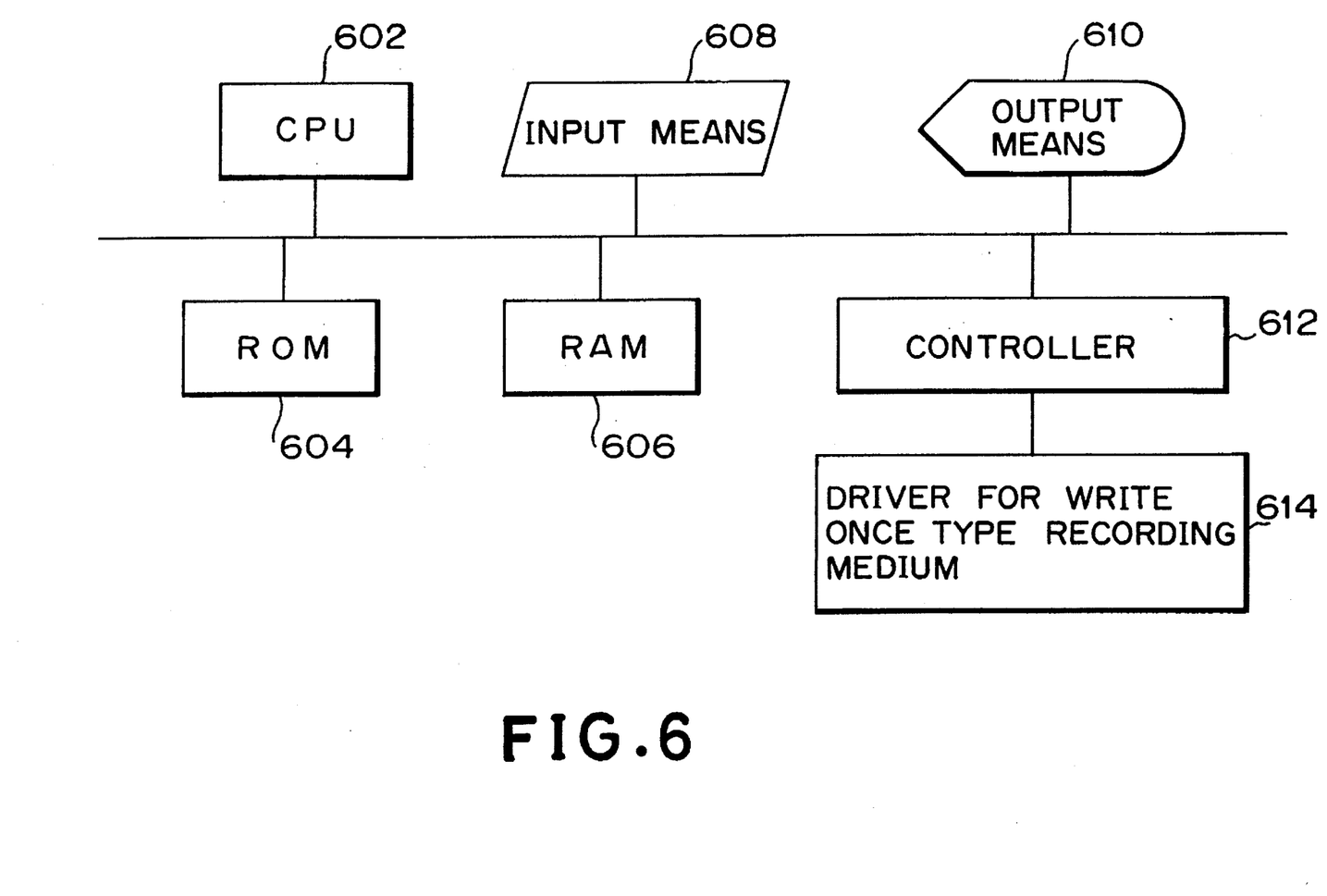
FIG. 6 is a hardware block diagram schematically showing a first embodiment of a formatting apparatus and a data reading/writing apparatus, according to the present invention.

FIG. 6 is a block diagram schematically showing a first embodiment of the hardware arrangement of an apparatus for formatting the above-described write once type recording medium of FIG. 4, according to the present invention. In the formatting apparatus of FIG. 6, reference numeral 602 designates a CPU (central processing unit) for controlling the overall arrangement of this formatting apparatus. Reference numeral 604 denotes a ROM (read-only memory) for previously storing a program for executing an initializing process when the power supply (not shown) of the formatting apparatus is turned ON. Reference numeral 606 denotes a RAM (random access memory) for temporarily storing data required during the operation of the program. Reference numeral 608 denotes an input means for inputting instructions of the formatting operation, such as a keyboard, a mouse, and a communication device. Reference numeral 614 denotes a driver for a write once type information recording medium, which formats the write once type information recording medium, and for writing data to and reading data from this recording medium. Reference numeral 610 is an output means for outputting information to a user, such as a CRT (cathode-ray tube), an LCD (liquid crystal display), and a communication device. Reference numeral 612 denotes a controller for controlling the driver 614 for a write once type information recording medium in response to the instructions issued from the CPU 602.

Figure 7:
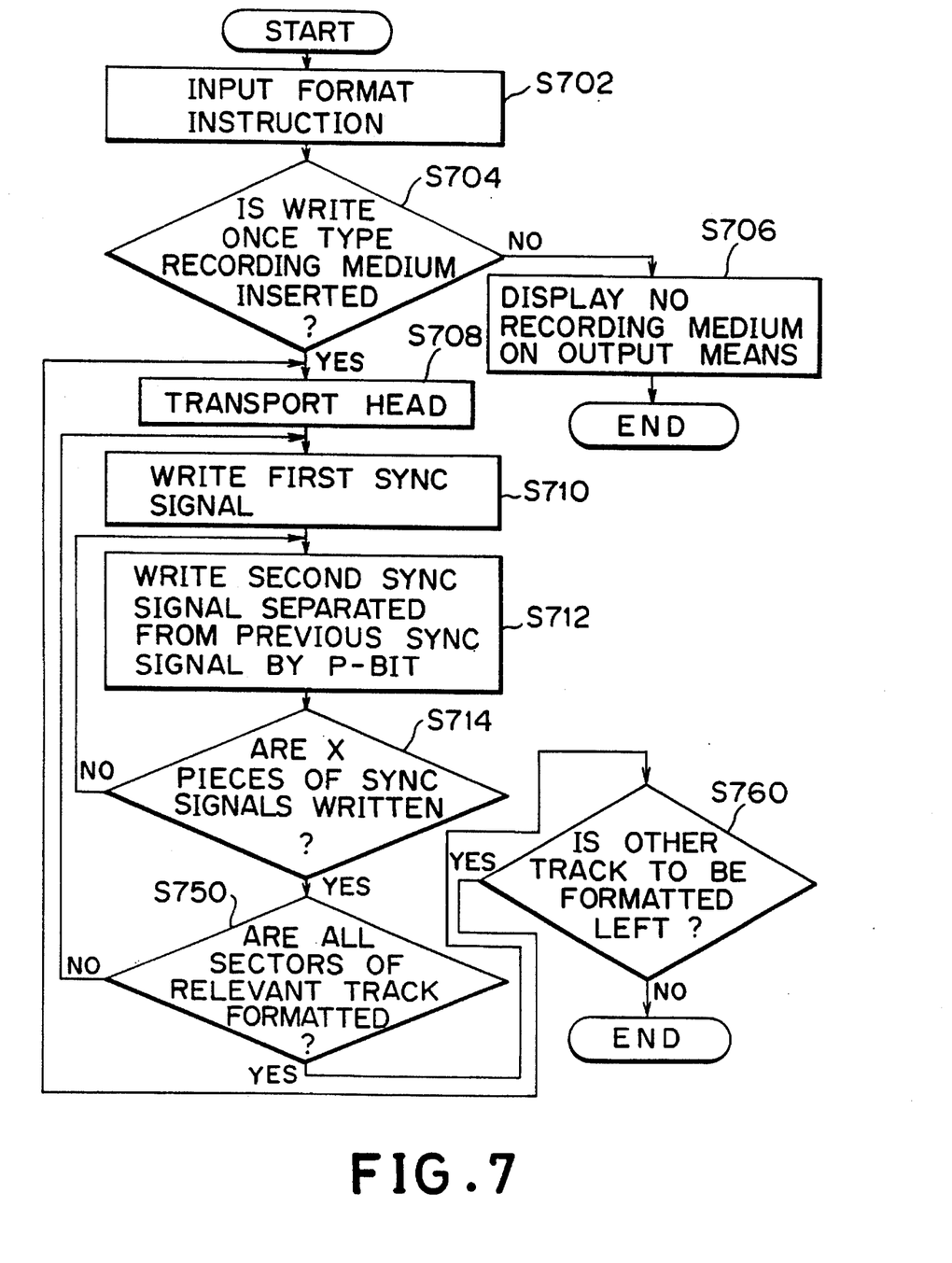
FIG. 7 is a flow chart for explaining a formatting operation executed in the first formatting apparatus and the first data reading/writing apparatus according to the present invention.

Referring now to a flow chart of FIG. 7, a description will be made of a formatting operation of the formatting apparatus shown in FIG. 6. At the first step S702 of this flow chart, the instruction for the formatting operation by the formatting apparatus is inputted. Then, at step S704, CPU 602 judges via the controller 612 whether or not a write once type information recording medium is inserted into the driver 614. If a write once type information recording medium is not inserted into the driver 614, this state is supplied to the output means 610 at step S706 and then the process terminates. On the other hand, when a write once type information recording medium is inserted into the driver 614, the CPU 602 instructs the controller 612 to move the head of the driver 614 to a predetermined track (S708). Subsequently, the first f-bit synchronization signal "F" is written to the starting position of a first sector on this track of the recording medium (S710). Furthermore, the second f-bit synchronization signal "F" is written into the position, which is adjacent to the first f-bit synchronization signal F and is separated by a p-bit data region (S712). The writing operation of the synchronization signal F is repeated until the synchronization signals F are written into the entire (x pieces of) frames in this sector which is being formatted (S714).

When x pieces of synchronization signals F have been written into this sector, another x pieces of synchronization signals F will be similarly written into the next sector (from S710 to S714). The CPU 602 handles as a single sector the region from the starting position of the first synchronization signal to the end position of the p-bit data following the x-th synchronization signal. It should be noted that the sector number or the like may be written into the starting position of the respective sectors. When the CPU 602 conforms that x pieces of synchronization signals F have been written into all of the sectors within this track (S750), the CPU 602 makes further judgment as to whether or not all of the desired tracks have been formatted (S760). When all of the desired tracks have not yet been formatted, the head of the diver 614 is transported to the succeeding track to commence the formatting operation of this track (from S708 to S750) under the control of the CPU 602. In contrast, when all of these desired tracks have been formatted, this process operation is completed (S760).

An embodiment of data reading/writing apparatus and a method for reading data form and writing data to the above-explained write once type information recording medium, in accordance with the present invention, will now be described with reference to FIGS. 8 and 9. A hardware block diagram of this data reading/writing apparatus is identical to the above-explained hardware block diagram of the formatting apparatus shown in FIG. 6. It should be noticed, however, that in order to increase the data read and write speed, a data memory having a memory capacity corresponding to a single track, and a memory processing circuit may be employed in the controller 612 of the data reading/writing apparatus, which will be described in more detail.

Figure 8:
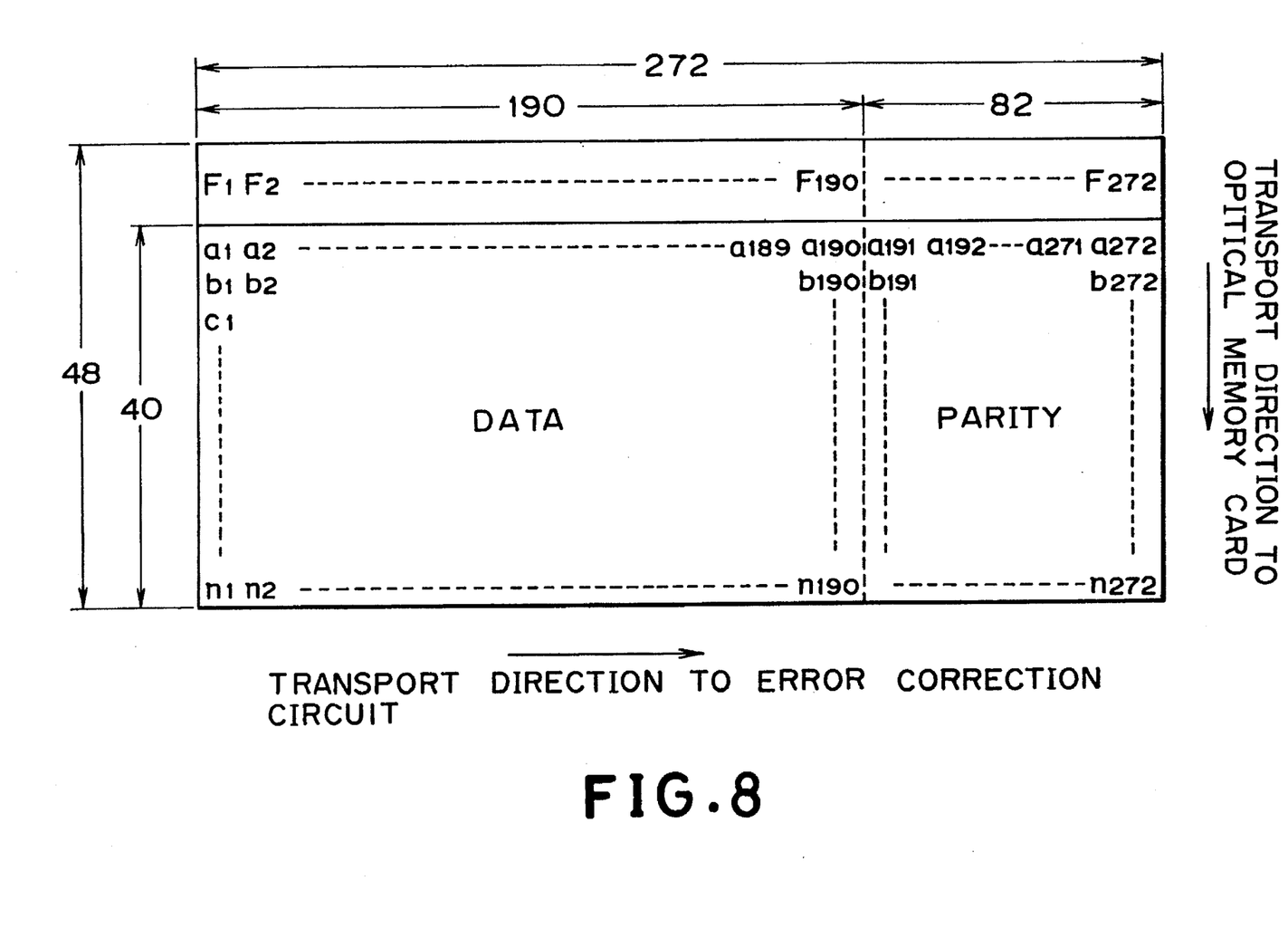
FIG. 8 is a diagram schematically illustrating a memory map of a memory incorporated in the controller employed in the apparatus of FIG. 7.
Figure 9:
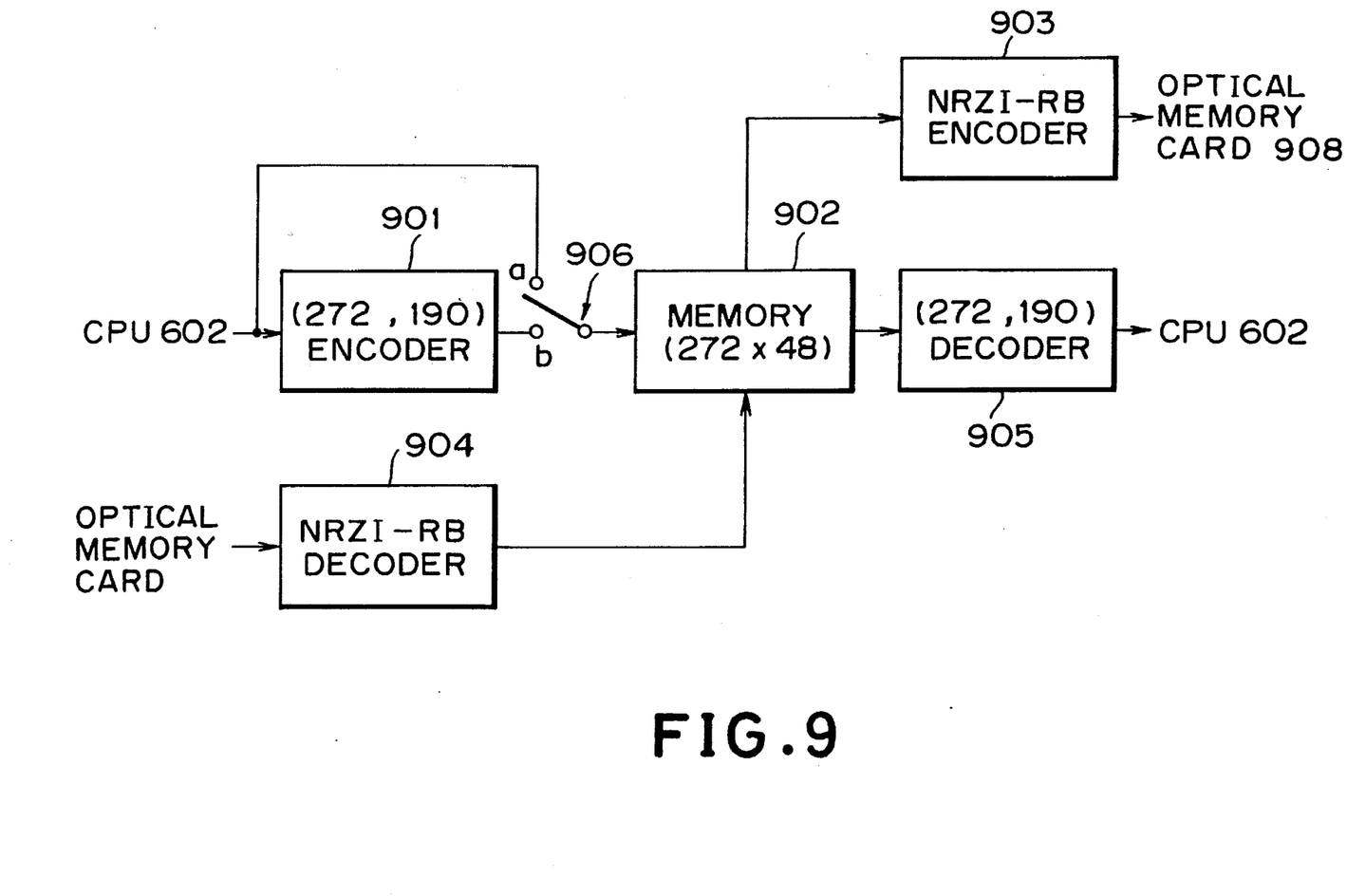
FIG. 9 is a schematic block diagram showing the processing circuit of the memory shown in FIG. 8.

FIG. 8 shows the memory map of a memory, which stores data contained in a single track. One code word in the row (horizontal) direction is composed of 272 bits, and 40 code words are arranged in the column (vertical) direction, one code word consisting of 190-bit data and an 82-bit error correction code. FIG. 9 is a schematic block diagram of a memory processing circuit having the memory map shown in FIG. 8. This memory processing circuit performs recording and reproducing operations using an optical memory card as the write once type information recording medium.

First, the data recording operation will be described. An encoder 901 produces error correction codes so that the data sent from CPU 602 are provided with the error correction codes, and then stored into a memory 902 in the form shown in FIG. 8. For instance, the row "a" (a1 to a272) shown in FIG. 8 is stored into the memory 902 as follows: First, a switch 906 is connected to the "a" side, and the data sent from CPU 602 are sequentially stored into the row "a" of the memory 902 as bits a1, a2, a3, - - - , a190. Thereafter, the switch 906 is connected to the "b" side, and the 82-bit error correction code produced by the encoder 901 is supplied to the bits a191–a272 of the memory 902.

The above-explained operation is successively and repeatedly performed with respect to the remaining rows "b" to "n" of the memory 902, so that both of the error correction codes and the data of all of the rows "a" to "n" are stored into the memory 902. Then, the data which have been stored into the memory 902 in the form of FIG. 8, are retrieved from this memory in the vertical direction as shown in FIG. 8, and are encoded by an encoder 903 into a data form recordable on an optical memory card. These data of the necessary rows together with the synchronization signals are stored into the optical memory card.

Next, a data reproducing operation from the optical memory card will now be explained. The data in the optical memory card have been stored by the above-described recording operation. The data read out from the optical memory card is decoded into a digital signal by a decoder 904. The digital signal is stored into the memory 902 in the vertical direction in such a manner that they are arranged in accordance with the memory map of FIG. 8. Subsequently, the data is retrieved from the memory 902 in the horizontal direction and is supplied to the decoder 905, and which processes the data in accordance with the error correction method. Thus, the error-corrected data is sent to the CPU 602 as reproduction data.

Figure 10A:
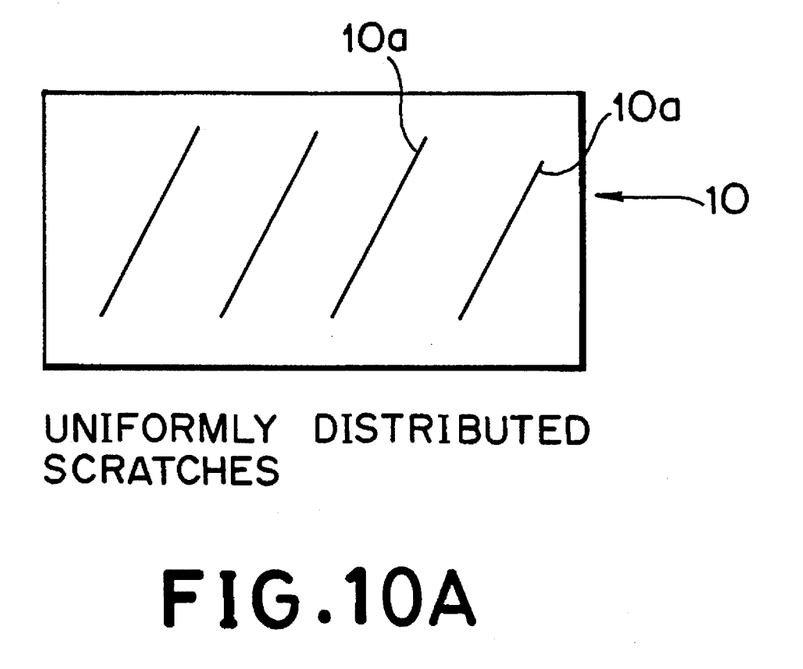
FIGS. 10A and 10B are explanatory diagrams of a scratched optical memory card.
Figure 10B:
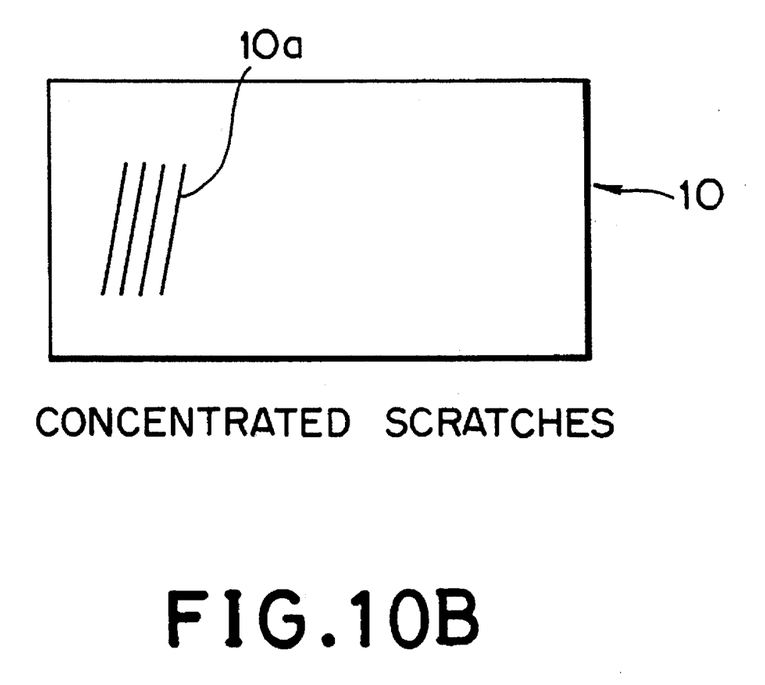

The above-described data recording/reproducing methods can achieve the effective error correction not only when scratches 10a are made in the optical memory card 908 in a uniform distribution as illustrated in FIG. 10A, (in this case, error corrections are carried out even in the conventional recording format), but also when scratches 10a are concentratedly made at one place as shown in FIG. 10B,. In particular, the error correction capability will be considerably increased in the case of a short sector, as compared with the conventional error correct ion method.

Embodiment 2

Figure 11:
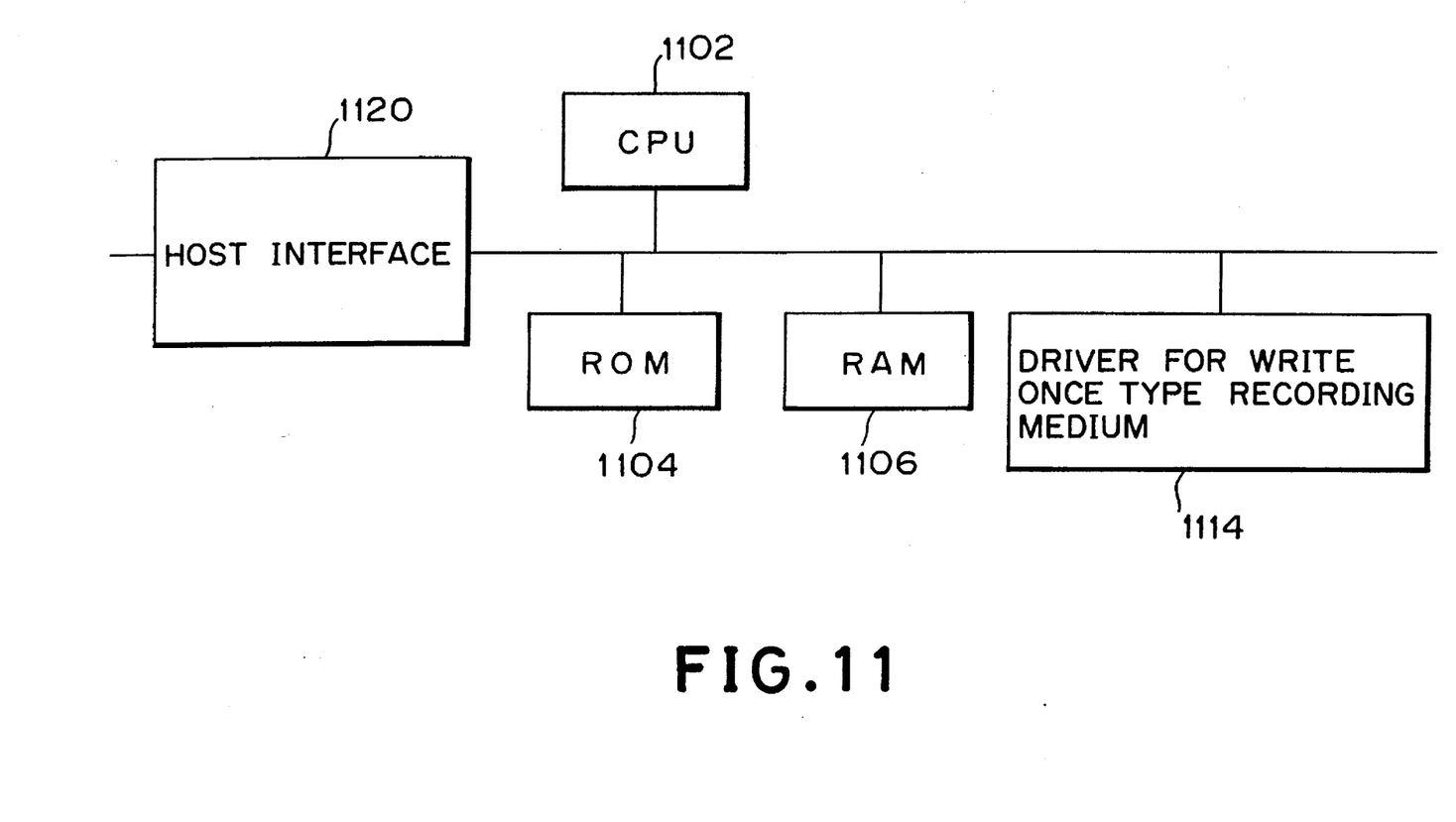
FIG. 11 is a hardwared block diagram schematically showing a second embodiment of a formatting apparatus and a data reading/writing apparatus according to the present invention.

FIG. 11, is a schematic block diagram showing a second embodiment of a hardware arrangement for a formatting apparatus and a data input/output device according to of the present invention. As is shown in this drawing, the second embodiment includes a host interface 1120 in accordance with SCSI or SASI which can be used as an input means and an output means instead of the input means 608 and the output means 610 of the formatting apparatus and the data input/output apparatus of the first embodiment. In addition, all or a part of the function of the controller 612 may be replaced by a CPU 1102, a ROM 1104, and a RAM 1106. Furthermore, the controller 612 may be interposed between a write once type recording medium driver 1114 and the CPU 1102. Alternatively, a communication interface with LAN (local area network) , WAN (wide area network) , or public network may be substituted for the host interface 1120, so that the interface is used as the input means and the output means.

As previously explained in detail, in accordance with the present invention, the bit storage efficiency to the frame can be increased. Also, the sector of a large size can be selected. As a consequence, the data recording efficiency and the error correction capability can be improved. Moreover, data can be additionally written on a sector without dividing it.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A write once type information recording medium having a format that includes a plurality of sectors, each of said sectors including x p-bit frames, each of said p-bit frames comprising:

an f-bit synchronization signal region; and a d-bit data region;

where x, p, f and d are positive integers and p is equal to (f+d).

2. The write once type information recording medium as claimed in claim 1 wherein:

said frame number "x" per said sector is selected to be 272;

said bit number "p" of the frame is selected to be 48;

said bit number "f" of the synchronizing signal region is selected to be 8; and said bit number "d" of the data region is selected to be 40.

3. The write once type information recording medium as claimed in claim 1, further comprising:

a data recording format having an n-th bit of an x-bit packet in which a v-bit error correction code is added to u-bit data, arranged in said d-bit data region of an n-th frame of said p-bit frames;

where x, p, f, d, n, u and v are positive integers and n is equal to or smaller than x.

4. The write once type information recording medium as claimed in claim 3 wherein:

said frame number "x" per said sector is selected to be 272;

said bit number "p" of the frame is selected to be 48;

said bit number "f" of the synchronizing signal region is selected to be 8;

said bit number "d" of the data region is selected to be 40;

said bit number "u" of the data is selected to be 190; and said bit number "v" of the error correction code is selected to be 82.

5. A method for formatting a write once type recording medium, by forming a plurality of sectors on said write once type recording medium, each of said plurality of sectors including x p-bit frames, each of said p-bit frames containing an f-bit synchronization signal region and a d-bit data region, comprising the steps of:

writing each of x synchronization signals into each of said f-bit synchronization signal regions followed by said d-bit data region;

where x, p, f and d are positive integers and p is equal to (f+d).

6. The formatting method as claimed in claim 5 wherein:

said frame number "x" per said sector is selected to be 272;

said bit number "p" of the frame is selected to be 48;

said bit number "f" of the synchronizing signal region is selected to be 8; and said bit number "d" of the data region is selected to be 40.

7. A method for writing data into a write once type recording medium having a format that includes sectors, each of said sectors including x p-bit frames, each of said p-bit frames containing an f-bit synchronization signal region and a d-bit data region, said method comprising:

a memory storage step of storing into a memory, at least one x-bit packet in which a v-bit error correction code is added to u-bit data; and a data writing step of writing the respective bits of said packet read out from said memory into said data regions of said x p-bit frames;

where x, p, f, d, u and v are positive integers.

8. The data writing method as claimed in claim 7 wherein:

said memory storage step includes a step of storing said at least one packet into a plurality of memories; and said data writing step includes a step of writing an n-th bit of each packet into an n-th frame;

where n is a positive integer equal to or smaller than x.

9. The writing method as claimed in claim 7 wherein:

said frame number "x" per sector is selected to be 272;

said bit number "p" of the frame is selected to be 48;

said bit number "f" of the synchronizing signal region is selected to be 8;

said bit number "d" of the data region is selected to be 40;

said bit number "u" of the data is selected to be 190; and said bit number "v" of said error correction code is selected to be 82.

10. A method for reading data from a write once type recording medium having a format that includes sectors, each of said sectors including x p-bit frames, respectively containing f-bit synchronization signal regions and d-bit data regions, said data recording method comprising the steps of:

storing into a memory, x data read out from said d-bit data regions of said x frames;

reading information from said x data stored in said memory bit by bit; and serially connecting the read information to form an x-bit packet;

where x, p, f and d are positive integers.

11. The reading method as claimed in claim 10 wherein:

said frame number "x" per said sector is selected to be 272;

said bit number "p" of the frame is selected to be 48;

said bit number "f" of the synchronizing signal region is selected to be 8; and said bit number "d" of the data region is selected to be 40.

12. A formatting apparatus for formatting a write once type recording medium, by forming a plurality of sectors on the write once type recording medium, each of said sectors including x p-bit frames, respectively containing f-bit synchronization signal regions and d-bit data regions, comprising;

a ROM (read only memory) for storing a program for executing an initializing process of said formatting apparatus when said formatting apparatus is energized;

input means for inputting an instruction of a format;

synchronization signal writing means for writing each of x synchronization signals into each of said synchronization signal regions, respectively followed by said d-bit data regions in accordance with the input instruction of a format; and output means for outputting an output indicating completion of said format after said write once type recording medium is formatted;

where x, p, f and d are positive integers.

13. The formatting apparatus as claimed in claim 12 wherein:

said frame number "x" per said sector is selected to be 272; and said bit number "p" of the frame is selected to be 48;

said bit number "f" of the synchronization signal region is selected to be 8; and said bit number "d" of the data region is selected to be 40.

14. A data writing apparatus for writing data into a write once type recording medium having a format including a plurality of sectors, each of said sectors including x p-bit frames, respectively containing f-bit synchronization signal regions and d-bit data regions, said data writing apparatus comprising:

a ROM (read-only memory) for storing a program for executing an initializing process of said data writing apparatus when said data writing apparatus is energized;

a memory for storing at least one x-bit packet in which a v-bit error correction code is added to u-bit data;

data writing means for writing each of x bits of said packet read out from said memory into each of said data regions of said x frames; and output means for outputting an output indicating that data writing is completed after said data is written;

where x, p, f, d, u and v are positive integers.

15. The data writing apparatus as claimed in claim 14 wherein:

said memory has a memory capacity sufficient to store a plurality of said packets; and said data writing means includes a means for writing an n-th bit of each of said plurality of packets stored in said memory into an n-th frame;

where n is a positive integer equal to or smaller than x.

16. The writing apparatus as claimed in claim 14 wherein:

said frame number "x" per sector is selected to be 272;

said bit number "p" of the frame is selected to be 48;

said bit number "f" of the synchronization signal region is selected to be 8;

said bit number "d" of the data region is selected to be 40;

said bit number "u" of the data is selected to be 190; and said bit number "v" of said error correction code is selected to be 82.

17. A data reading apparatus for reading data from a write once type recording medium having a format including sectors, each of said sectors including x p-bit frames, respectively containing f-bit synchronization signal regions and d-bit data regions, said data reading apparatus comprising:

a ROM (read-only memory) for storing a program for executing an initializing process of said data reading apparatus when said data reading apparatus is energized;

a memory for storing x data read out from said data regions of said x frames; and reading means for reading information from said x data stored in said memory bit by bit;

where x, p, f and d are positive integers.

18. The reading apparatus as claimed in claim 17 wherein:

said frame number "x" per said sector is selected to be 272;

said bit number "p" of the frame is selected to be 48;

said bit number "f" of the synchronization signal region is selected to be 8; and said bit number "d" of the data region is selected to be 40.

* * * * *